United States Patent [19]
Cavanagh

[11] 3,744,931
[45] July 10, 1973

[54] BRINE RESISTANT PROPELLER

[75] Inventor: John R. Cavanagh, Toronto, Ontario, Canada

[73] Assignee: Logic Systems Corporation Limited, Toronto, Ontario, Canada

[22] Filed: July 26, 1971

[21] Appl. No.: 165,443

[52] U.S. Cl. ................................ 416/224, 416/241
[51] Int. Cl. ............................................. B63h 1/14
[58] Field of Search ................ 416/241 A, 240, 224, 416/229

[56] References Cited
UNITED STATES PATENTS

| | | | |
|---|---|---|---|
| 216,880 | 6/1879 | Nelson | 416/241 |
| 2,077,959 | 4/1937 | Smith | 416/224 |
| 2,120,277 | 6/1938 | Grierson | 416/229 X |
| 2,728,401 | 12/1955 | Brannon | 416/224 UX |
| 3,133,596 | 5/1964 | Berliner | 416/241 X |
| 3,256,939 | 6/1966 | Novak | 416/241 UX |
| 3,310,116 | 3/1967 | Saeki et al. | 416/241 X |
| 3,318,388 | 5/1967 | Bihlmire | 416/229 X |

FOREIGN PATENTS OR APPLICATIONS

| | | | |
|---|---|---|---|
| 1,115,585 | 10/1961 | Germany | 416/241 |
| 1,800,101 | 4/1970 | Germany | 416/132 |
| 359,036 | 1/1962 | Switzerland | 416/224 |

*Primary Examiner*—Everette A. Powell, Jr.
*Attorney*—Cavanagh & Norman

[57] ABSTRACT

The specification discloses an aluminum alloy propeller for marine use especially in sea water and which has an entire coating of a vulcanized rubber composition thereon.

7 Claims, 3 Drawing Figures

Patented July 10, 1973 3,744,931

INVENTOR
JOHN R. CAVANAGH

BY Cavanagh & Norman

BRINE RESISTANT PROPELLER

This invention relates to a brine resistant propeller for marine use.

Marine propellers, especially in sea water, are subject to severe corrosion if made from die cast metal and especially if the latter contains aluminum or comprises an aluminum alloy. Thus aluminum alloy propellers which are used extensively in fresh water marine use are severely corroded in salt water use and are rendered impractical for use in other than in inland waterways.

Attempts have been made to apply coatings to aluminum objects, aluminum boat hulls and for protection in sea water. Such coatings may generally be classed as paints of the natural or synthetic resin type. Epoxy resins have been used with some degree of success though in general the application of natural and synthetic resins to aluminum surfaces suffers from a severe disadvantage in the degree of bond achieved between the coating and the aluminum surface. Generally the preparation of the aluminum surface, such as by anodizing or etching has assisted the bonding of resin or paint coatings but in any case such coatings have not heretofor been applied to the entire aluminum surfaces of a product such as a propeller for marine use. Embrittlement of resin and paint coatings due to weather exposure, the action of ultraviolet rays from the sun, combined with wetting and drying of exposed surfaces during use, especially in propeller installations in outboard motors has rendered the coating of aluminum propellers for salt water or brine marine use substantially impractical heretofor. The difficulty, therefore, derives from a number of causes relating to the easy susceptibility of aluminum and most of its alloys to attack by brine, the difficulty of achieving a satisfactory bond between a coating and an aluminum surface and the susceptibility of natural and synthetic paints and resins applied as coatings to weathering action of the sun, chipping, shrinkage and difficulties in coefficience of expansion as compared with aluminum and the like.

It is a main object of the present invention to provide an aluminum propeller for salt water marine use having an entire coating of a vulcanized elastomer.

It is another object of the invention to provide an aluminum propeller for marine use having an entire coating of a vulcanized elastomer and a hub insert separated from the propeller by said coating and adapted by virtue of said coating to dampen the transmission of high frequency vibrations to a propeller shaft.

Other objects of the invention will be appreciated by a study of the following specification taken in conjunction with the accompanying drawings.

The propeller 10 having a hub structure 11 carrying the blades 12 is formed of an inner metal body 13 preferably of a die cast type aluminum alloy such as of about 3.5 percent copper and about 8.5 percent silicon, having a commercial designation in the United States as Alloy 380 and generally regarded as a general purpose alloy having good structural properties of relatively high strength not requiring special heat treat. Such an aluminum alloy is entirely unsuitable for immersion in brine especially when exposed to air and sunlight when still wet such as will happen ordinarily in use on an outboard motor of a boat. Even under conditions of continuous immersion in brine and especially in sea water the other minerals, aside from the salt in sea water, increase the susceptibility of such an aluminum alloy for corrosion.

Figure 3:
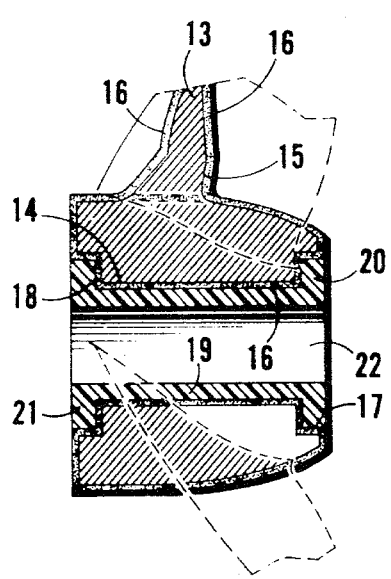
FIG. 3 is a section on the line 3—3 of FIG. 2.

The hub structure 11 embodies an enlarged bore 14 (FIG. 3) in the body casting 13 so that the body casting embodying the hub, its bore and the blades in one piece has aluminum surfaces 15 defined by the casting dies and or any trimming, machining or polishing of the casting prior to further processing of the invention. Preferably the exterior surfaces 15 of the body casting 13 of the invention after trimming, machining and finishing as desired are shot peened such as by conventional shot blast technique to improve the structural quality of the surface thereof. Additionally the casting surfaces may be anodized or etched though this latter step may not be essential depending upon the control of the following coating steps.

The casting then with or without surface treatment is sprayed with a synthetic vulcanizable elastomer and especially polycholoroprene (neoprene) with a phenolic resin in solvent. Just prior to spraying the body casting should be heated to a temperature of the order of 150° Fahrenheit and not exceeding 200° Fahrenheit and the spraying should be by way of a fine spray for a longer period of time rather than a coarse spray for a shorter period of time for the reason that it is desirable to permit the solvents to evaporate as the coating is applied. The coating should be applied for a thickness of the order of between 50 and 200 one-thousands of an inch and final curing should be carried on for a period of time of the order of 3 to 5 minutes under infra-red heat lamps to substantially full vulcanization at which the exterior surface of the coating will have an adhesive feel to a touch of the hand.

Figure 1:
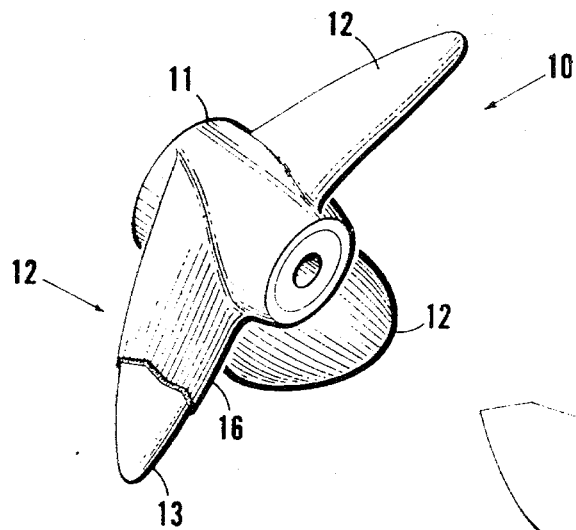
FIG. 1 is a perspective view of a conventional shape of propeller made according to the invention.
Figure 2:
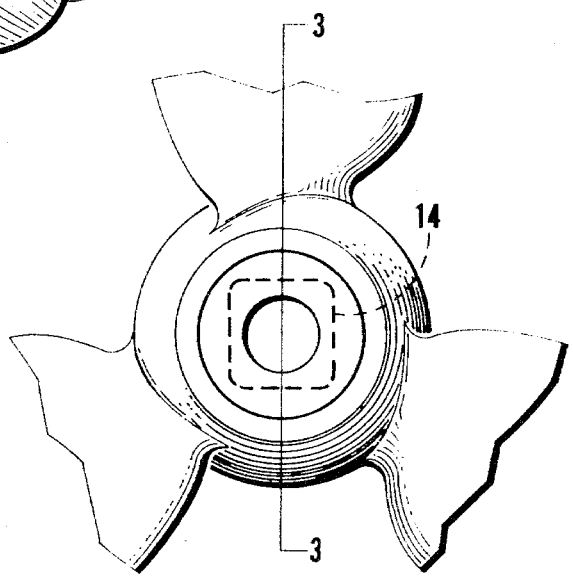
FIG. 2 is an external view looking toward the stern area of the hub structure of the propeller of FIG. 1.

The enlarged bore 14 as shown in FIG. 2 also carries the entire vulcanized elastomer coating 16 and is of noncircular shape terminating in annular circular recesses 17, 18 into which is cast a plastic mounting insert 19 preferably formed of an epoxy resin having outer circular flanges 20, 21 defining the ends of the internal bore 22 which latter may embody a key slot (not shown). The hub insert 19 is separated from the body casting 13 by vulcanized coating 16 which latter serves to absorb or dampen high frequency vibrations generated by the propeller and which otherwise would be transmitted to the drive shaft (not shown) mounting the propeller.

An elastomer coating containing a chlorine radical demonstrates a peculiar and somewhat unaccountable affinity for a bond with a cast aluminum surface in the context of the present invention. It is known, for example, that chlorine in the presence of aluminum has in some respects a catalytic or synergistic function relative to the physical or chemical attachment or combination of aluminum with other substances. The operation of coating the aluminum with the elastomer as set forth herein is substantially enhanced by undertaking such coating operations in an atmosphere containing chlorine gas.

I claim as my invention:

1. A rigid brine resistant marine propeller comprising: an aluminum alloy body casting defining a propeller hub and propeller blades extending therefrom; a polychloroprene resin containing elastomer coating of uniform thickness between 50 and 200 thousands of an inch extending over and sealing the entire surfaces of said body casting.

2. The propeller of claim 1 having an enlarged non-circular bore in the hub of said casting; and a cast plastic mounting insert for said propeller within said bore and separated from the casting by said coating to provide a high frequency absorbing mounting for the propeller.

3. The propeller of claim 1 in which the aluminum forming the body casting is of an alloy composition containing about 3.5 percent copper and about 8.5 percent silicon.

4. The propeller of claim 1 and a chlorine radical associated with the elastomer coating.

5. The propeller of claim 1 and shot blasted surfaces on said body casting.

6. The propeller of claim 1 and etched surfaces on the body casting.

7. The propeller of claim 1 and anodized surfaces on the body casting.

* * * * *